(12) United States Patent
Kipling

(10) Patent No.: US 9,808,092 B2
(45) Date of Patent: Nov. 7, 2017

(54) ERGONOMIC-DEVICE SUPPORT ASSEMBLY FOR ERGONOMIC DEVICE

(71) Applicant: Craig Geoffrey Kipling, Caledon (CA)

(72) Inventor: Craig Geoffrey Kipling, Caledon (CA)

(*) Notice: Subject to any disclaimer, the term of this patent is extended or adjusted under 35 U.S.C. 154(b) by 55 days.

(21) Appl. No.: 15/046,790

(22) Filed: Feb. 18, 2016

(65) Prior Publication Data

US 2017/0238714 A1    Aug. 24, 2017

(51) Int. Cl.
| | |
|---|---|
| *A47C 7/50* | (2006.01) |
| *A47C 16/02* | (2006.01) |
| *A47G 27/02* | (2006.01) |
| *F16M 11/18* | (2006.01) |
| *A47B 9/00* | (2006.01) |

(52) U.S. Cl.
CPC .............. *A47C 16/025* (2013.01); *A47B 9/00* (2013.01); *A47G 27/0231* (2013.01); *F16M 11/18* (2013.01)

(58) Field of Classification Search
CPC ..... A47B 2200/13; A47B 83/008; A47B 9/00; A47C 16/025; A47G 27/0231; F16M 11/18
USPC ....... 297/423.1, 423.12, 423.34, 423.36, 135
See application file for complete search history.

(56) References Cited

U.S. PATENT DOCUMENTS

| | | | | |
|---|---|---|---|---|
| 187,429 | A * | 2/1877 | Sykes ................... | A47B 83/045 297/143 |
| 1,339,669 | A * | 5/1920 | Rapp ..................... | A47B 85/08 108/93 |
| 4,134,614 | A * | 1/1979 | Fielding, Sr. ........ | A47B 83/008 248/118 |
| 5,281,017 | A * | 1/1994 | Geiss, II ............... | A47B 37/00 312/194 |
| 5,383,570 | A | 1/1995 | Gordon | |
| 5,547,270 | A * | 8/1996 | Dang .................... | A47B 39/00 297/140 |
| 5,727,848 | A * | 3/1998 | Gazard .................. | A47C 7/506 297/284.8 |
| 6,056,363 | A * | 5/2000 | Maddox ............... | A47C 3/0257 297/115 |
| 6,209,952 | B1 * | 4/2001 | Huang ................... | A47B 39/00 297/143 |
| 6,227,614 | B1 * | 5/2001 | Rubin .................... | A47C 9/022 297/143 |

(Continued)

FOREIGN PATENT DOCUMENTS

| | | |
|---|---|---|
| DE | 102007002032 A1 | 7/2008 |
| JP | 2006001388 A | 1/2006 |

OTHER PUBLICATIONS

Sit-Stand Smartmat, "About Us_Desktop Elevator_Adjustable Height Desks", retrieved online at http://www.SitStandSmartMat. com on Dec. 3, 2015.

(Continued)

*Primary Examiner* — Jose V Chen

(57) ABSTRACT

An apparatus has an ergonomic-device support assembly including a stationary frame assembly configured to be received and selectively positioned underneath a desk relative to a user. The ergonomic-device support assembly is configured to receive and support an ergonomic device. This is done in such a way that the ergonomic device is selectively movable relative to the user of the desk between an extended-deployment position and a retracted-storage position.

20 Claims, 13 Drawing Sheets

(56) References Cited

U.S. PATENT DOCUMENTS

| | | | | |
|---|---|---|---|---|
| 6,296,408 | B1* | 10/2001 | Larkin | A47B 83/001 400/681 |
| 6,439,657 | B1* | 8/2002 | Tholkes | A47B 9/02 297/135 |
| 6,874,431 | B1* | 4/2005 | Danna | A47B 21/03 108/102 |
| 7,439,694 | B2* | 10/2008 | Atlas | A47B 9/04 108/146 |
| 7,556,307 | B2 | 7/2009 | Ohtsubo et al. | |
| 7,712,816 | B2 | 5/2010 | Ujimoto et al. | |
| 7,823,973 | B2* | 11/2010 | Dragusin | A47C 7/72 108/50.01 |
| 8,249,773 | B2* | 8/2012 | Kawada | A61G 5/043 180/21 |
| 8,939,500 | B2* | 1/2015 | Voigt | A47B 83/02 297/170 |
| 9,167,894 | B2* | 10/2015 | DesRoches | A47B 9/20 |
| 9,433,288 | B2* | 9/2016 | Voigt | A47B 83/02 |
| 9,596,929 | B2* | 3/2017 | Koulizakis | A47B 21/0314 |
| 2001/0032916 | A1* | 10/2001 | Wess | A61G 5/10 248/349.1 |
| 2005/0275322 | A1* | 12/2005 | Mosel | A47B 9/20 312/312 |
| 2010/0201165 | A1* | 8/2010 | Dankovich | A47B 83/001 297/135 |
| 2013/0106146 | A1* | 5/2013 | Leclaire | E05B 75/00 297/135 |

OTHER PUBLICATIONS

"EZ Sliders™ 8-Piece Furniture Moving Set", retrieved online at http://www.bedbathandbeyond.com/store/product/ez-sliders-8-piece-furniture-moving-set/1014650628SLIDERS on Dec. 4, 2015.

"Rich Brown Sit-Stand SmartMat", retrieved online at http://www.sitstandsmartmat.com/product-p/ssm1.htm on Dec. 3, 2015.

* cited by examiner

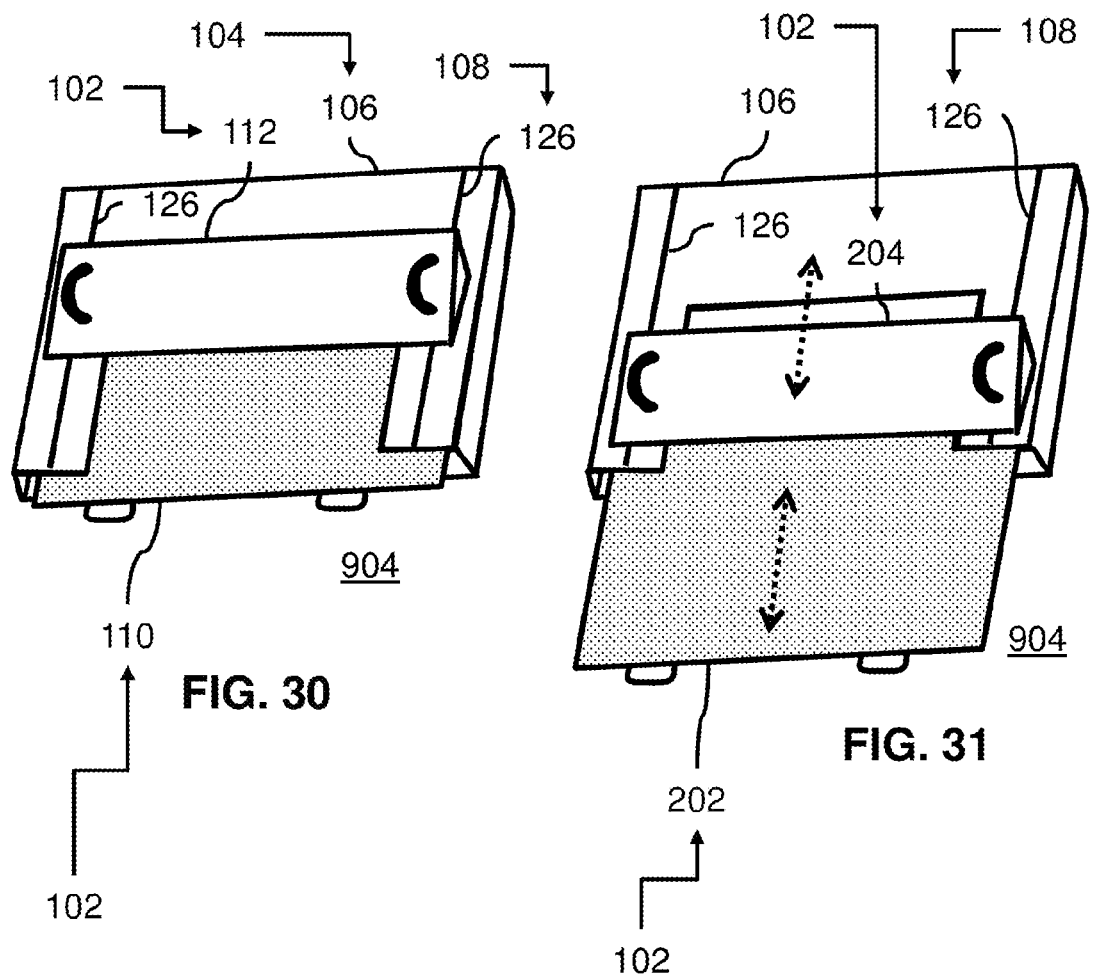

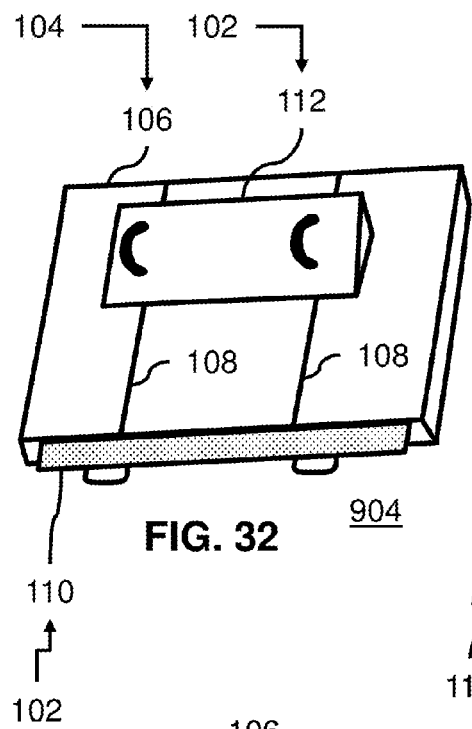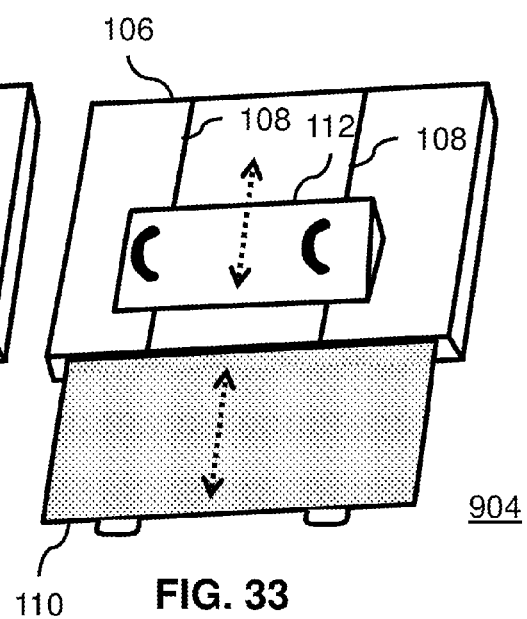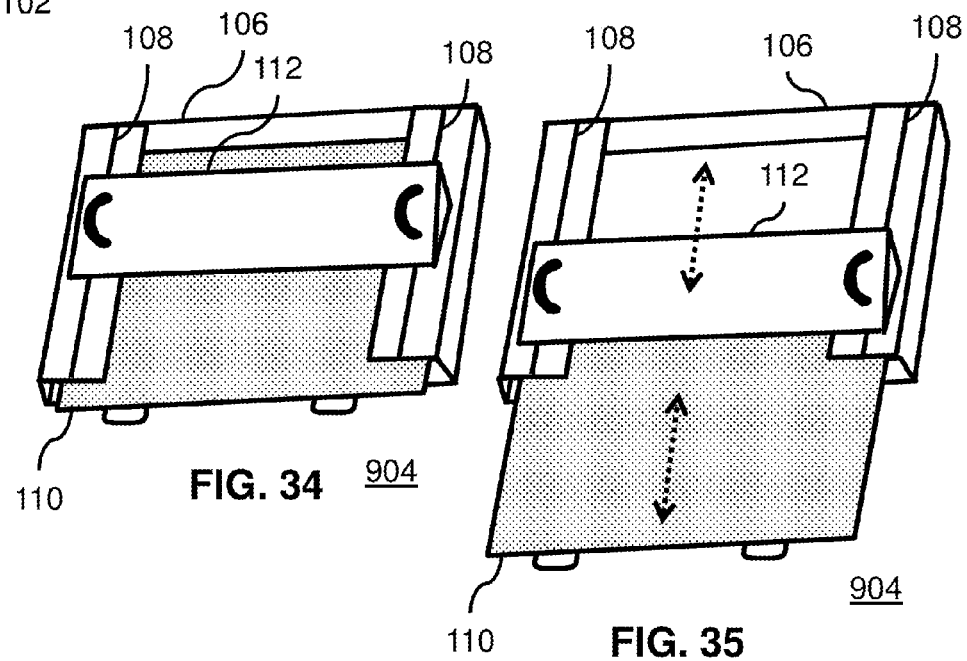
FIG. 32
FIG. 33
FIG. 34
FIG. 35

ERGONOMIC-DEVICE SUPPORT ASSEMBLY FOR ERGONOMIC DEVICE

TECHNICAL FIELD

This document relates to the technical field of (and is not limited to) an apparatus having an ergonomic-device support assembly configured to support an ergonomic device.

BACKGROUND

Ergonomic design (also known as human factors, comfort design or functional design) is the practice of designing products, systems, or processes to take proper account the interaction with people (users), and may include disciplines, such as psychology, engineering, biomechanics, industrial design, physiology, etc. Ergonomics includes design of equipment and devices that fit with usage of the human body. The International Ergonomics Association defines ergonomics or human factors as the scientific discipline concerned with the understanding of interactions among humans and other elements of a system, and the profession that applies theory, principles, data and methods to design in order to optimize human well-being and overall system performance.

SUMMARY

It will be appreciated that there exists a need to mitigate (at least in part) at least one problem associated with the existing ergonomic devices (also called the existing technology). After much study of the known systems and methods with experimentation, an understanding of the problem and its solution has been identified and is articulated as follows:

Ergonomic design is employed to fulfill the goals of occupational health and safety and productivity, and is used for the design of such things as furniture and interfaces to machines and equipment. Proper ergonomic design is necessary for the prevention of repetitive strain injuries and other musculoskeletal disorders, which can develop over time and can lead to long-term disability (for users). Ergonomic design fits the user with equipment, taking into account the user's capabilities and limitations in seeking to ensure that tasks, functions, information and/or the environment suit each user. To assess the fit between a user and a system (such as, a desk, etc.), ergonomists may consider the job (activity) being done and the demands on the user and the equipment used (size and shape for the task).

FIGS. 1 to 4 depict views of embodiments of prior art. More specifically, FIGS. 1 to 4 depict side views. Referring to the existing ergonomic devices as depicted in FIGS. 1 to 4, a desk includes a height-adjustable horizontal work surface. As depicted in FIGS. 1 and 4, a user is standing in front of the desk that is positioned on a working surface. As depicted in FIGS. 2 and 3, the user is sitting in front of the desk (in a chair). The height-adjustable horizontal work surface is configured to support a computer (so that the user may use the computer). In accordance with the embodiments as depicted in FIGS. 1 and 2, the desk is configured to be height adjustable (in accordance with a desired position for facilitating ergonomic comfort of the user relative to the computer). In accordance with the embodiments as depicted in FIGS. 3 and 4, the desk is configured to be fixed in height, and the desk includes a height-adjustable assembly that is positioned on a top surface of the desk, and the height-adjustable assembly is positioned in accordance with a desired position for facilitating ergonomic comfort of the user relative to the computer. The height-adjustable assembly provides the height-adjustable horizontal work surface on which the computer is positioned thereon.

The problem associated with the embodiments as depicted in FIGS. 1 to 4 is that the usage (placement) of an existing ergonomic device (such as, and not limited to, an anti-fatigue floor mat, which is known and not depicted) in front of the desk is not generally convenient. It is recommended that the user alternate usage of the desk between the sitting position (as depicted in FIGS. 2 and 4) and the standing position (as depicted in FIGS. 1 and 3). Changing between the sitting position and the standing position relative to the desk causes the user to periodically move, and thereby assists the user to avoid becoming stagnant in any one position (leading to muscle fatigue or cramps, stress on the muscles, etc.). Ergonomists recommend the usage of an anti-fatigue mat for the case where users are standing (at a desk) to reduce the fatigue and/or stress caused by standing on a hard surface and to decrease foot and lower limb disorders. So, when the user wishes to change from the standing position to the sitting position (in front of the desk), the user is required to move the anti-fatigue floor mat away from the desk so that the user may sit on the chair in front of the desk. It is not convenient to periodically move the anti-fatigue floor mat throughout the day, and, as a result, the user is likely to be motivated to remain either in the standing position or the seated position as a result (and this leads to muscular cramping, etc.). Moreover, the anti-fatigue floor mat is either never used or is always used (leading to unwanted injury for the user). Currently, the user is required to bend over (bend at the hips) in order to move the mat, and/or the kicking of the mat (in order to move the mat) may force awkward postures for the user and thereby expose the user to potential injury.

To mitigate, at least in part, at least one problem associated with the existing technology, there is provided (in accordance with a major aspect) an apparatus. The apparatus has an ergonomic-device support assembly including a stationary frame assembly configured to be received and selectively positioned underneath a desk relative to a user. The ergonomic-device support assembly is configured to receive and support an ergonomic device in such a way that the ergonomic device is selectively movable relative to the user of the desk between an extended-deployment position and a retracted-storage position (preferably with less effort, or no effort, needed from a user in order to move the ergonomic device).

The technical effect of the apparatus is that the usage of an ergonomic device is more likely to happen when the user properly uses the desk by alternating between the standing position and the sitting position. Changing between the sitting position and the standing position at the desk causes the user to periodically move, and thereby assists the user to avoid becoming stagnant in any one position (leading to muscle fatigue or cramps, stress on the muscles, etc.). So, when the user wishes to change between the standing position and the sitting position (in front of the desk), the apparatus assists in movement of the ergonomic device (such as, the anti-fatigue floor mat) relative to the desk. The apparatus is configured to make it convenient (for the user) by facilitating periodic movement of the anti-fatigue floor mat throughout the day (as required by the user), and, as a result, the user is likely to be motivated to alternate (from time to time) between the standing position and the seated position (throughout the day) as a result (and this leads to less muscular cramping and/or user discomfort, etc., that normally results from prolonged user positioning at either one of the standing position and the sitting position). Moreover, the anti-fatigue floor mat (the ergonomic device) may be conveniently used or deployed or stored (thereby, advantageously avoid or reduce unwanted injury to the user).

Other aspects are identified in the claims.

Other aspects and features of the non-limiting embodiments may now become apparent to those skilled in the art upon review of the following detailed description of the non-limiting embodiments with the accompanying drawings.

This Summary is provided to introduce concepts in simplified form that are further described below in the Detailed Description. This Summary is not intended to identify key features or essential features of the disclosed or claimed subject matter, and is not intended to describe each disclosed embodiment or every implementation of the disclosed or claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIGS. 5 to 39 depict views in accordance with embodiments of an apparatus including an ergonomic-device support assembly configured to receive and support an ergonomic device (as described below).

Figures 1, 2:
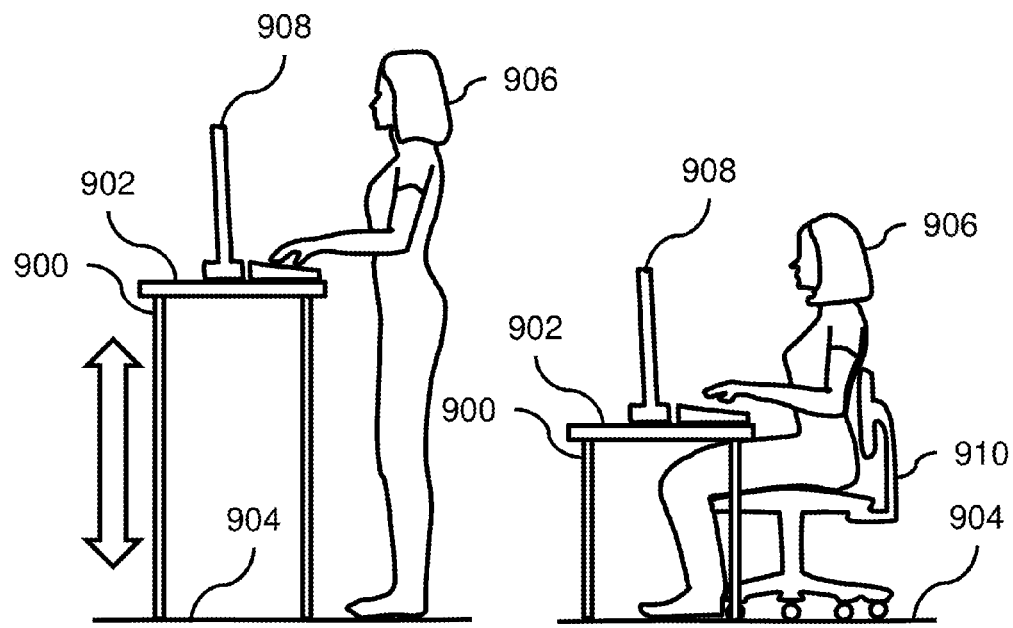
FIGS. 1 to 4 depict views of embodiments of the prior art (as described above)
Figures 3, 4:
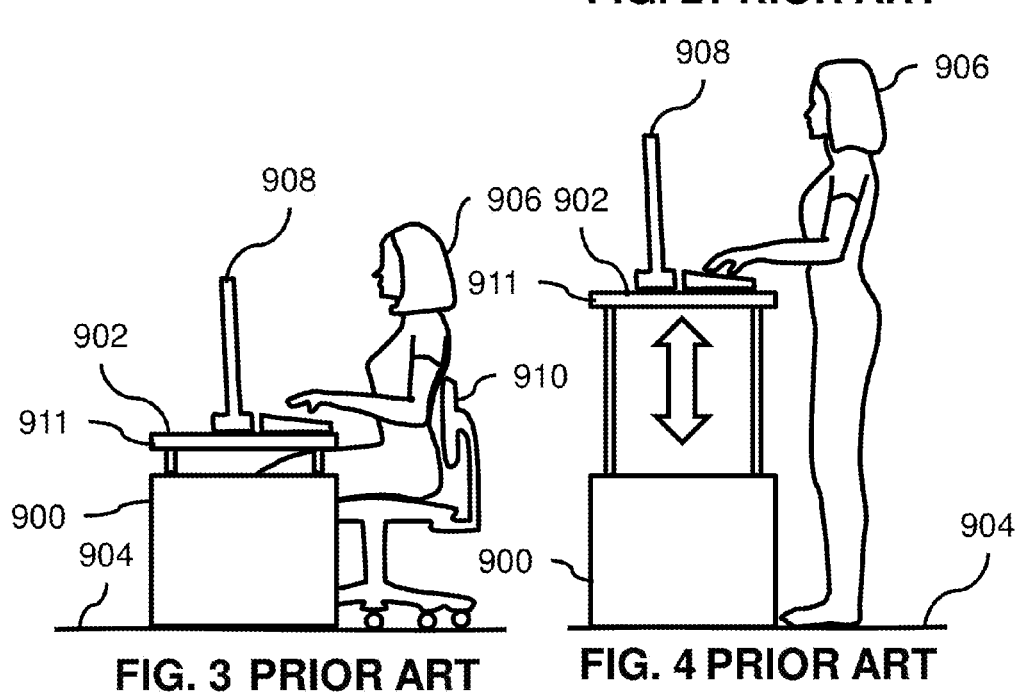

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS 102 ergonomic device
104 ergonomic-device support assembly
106 stationary frame assembly
108 movable frame assembly
110 first ergonomic device
112 second ergonomic device
114 opposed track sections
116 slide bar
118 sliding device
120 handle
122 roller mechanism
124 torsion spring device
125 leading sheet
126 spaced-apart rails
202 anti-fatigue floor mat
204 foot-rest device
206 motor
900 desk
902 height-adjustable horizontal work surface
904 working surface
906 user
908 computer
909 display
910 chair
911 height-adjustable assembly
912 keyboard tray
913 keyboard
914 roller device
916 hand
918 foot

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

FIGS. 5 to 39 depict views in accordance with embodiments of an apparatus including an ergonomic-device support assembly 104 configured to receive and support an ergonomic device 102. More specifically, FIGS. 5 to 13, 20, 22, 24 to 26 and 28 to 29 depict side views of embodiments of the apparatus. FIGS. 14 to 19, 21 and 30 to 39 depict top perspective views of embodiments of the apparatus. FIG. 23 depicts a front end view. FIG. 27 depicts a side perspective view of embodiments of the apparatus.

In accordance with a first general embodiment (aspects of which are depicted in FIGS. 5 to 8, and generally applicable to all FIGS.), the apparatus includes (and is not limited to) an ergonomic-device support assembly 104. The ergonomic-device support assembly 104 includes (and is not limited to) a stationary frame assembly 106 configured to be received and selectively positioned underneath a desk 900 relative to a user 906 that is positioned in front of the desk 900. The ergonomic-device support assembly 104 is configured to receive (directly or indirectly) and support (directly or indirectly) an ergonomic device 102 (such as an anti-fatigue floor mat, etc., and any equivalent thereof). This is done in such a way that the ergonomic device 102 is selectively movable relative to the user 906 of the desk 900 between (A) an extended-deployment position (as depicted in FIGS. 6, 8, 10 and 13, and in other FIGS.) and (B) a retracted-storage position (as depicted in FIGS. 5, 7, 9 11, and 12, and in other FIGS.). Preferably, the ergonomic-device support assembly 104 is configured to move the ergonomic device 102 with less effort, or no effort, needed from a user (by reducing frictional movement of the ergonomic device 102 and/or by providing assistance for moving the ergonomic device 102, and any equivalent thereof). For instance, in accordance with a preferred embodiment, the stationary frame assembly 106 defines (provides) an opening (frontal open section) configured to facilitate movement (linear movement or other types of movements) of the ergonomic device 102 relative to the stationary frame assembly 106, such as into and out of the interior of the stationary frame assembly 106, etc. In the extended position, the user 906 uses the ergonomic device 102 (if so desired). In the retracted position, the user 906 does not use the ergonomic device 102, and the ergonomic device 102 is positioned away from the user 906 (if so desired). Alternatively, the user 906 does use the ergonomic device 102, and the ergonomic device 102 is positioned away from the user 906 (if so desired). It will be appreciated that for the case of the first general embodiment, the apparatus includes the ergonomic-device support assembly 104 that is configured to be retrofitted to an existing instance of the ergonomic device 102 (for the aftermarket case). For this case, the ergonomic device 102 and the apparatus (the ergonomic-device support assembly 104) are purchased separately by the user or for the user (and then combined by the user).

In accordance with a second general embodiment (aspects of which are depicted in FIGS. 5 to 8, and generally applicable to all FIGS.), the apparatus includes (and is not limited to) the combination of an ergonomic device 102 and an ergonomic-device support assembly 104. The ergonomic-device support assembly 104 includes a stationary frame assembly 106 configured to be received and selectively positioned underneath a desk 900 relative to a user 906. The ergonomic-device support assembly 104 is configured to receive and support the ergonomic device 102. This is done in such a way that the ergonomic device 102 is selectively movable relative to the user 906 of the desk 900 between an extended-deployment position (as depicted in FIGS. 6, 8, 10, and 13, and in other FIGS.) and a retracted-storage position (as depicted in FIGS. 5, 7, 9, 11 and 12, and in other FIGS.). It will be appreciated that for the case of the second general embodiment, the apparatus includes the combination of the ergonomic-device support assembly 104 and the ergonomic device 102, and the apparatus is then purchased for usage by (provided to) the user 906 (without requiring the user to integrate the ergonomic-device support assembly 104 with the ergonomic device 102 as a matter of convenience). This case is for the original equipment manufacturer (and not necessarily for the aftermarket case). For this case, the ergonomic device 102 and the apparatus (the ergonomic-device support assembly 104) are purchased together (as an integrated unit), which is then provided to the end user. The stationary frame assembly 106 may be made of metal components and/or plastic components.

Figure 5:
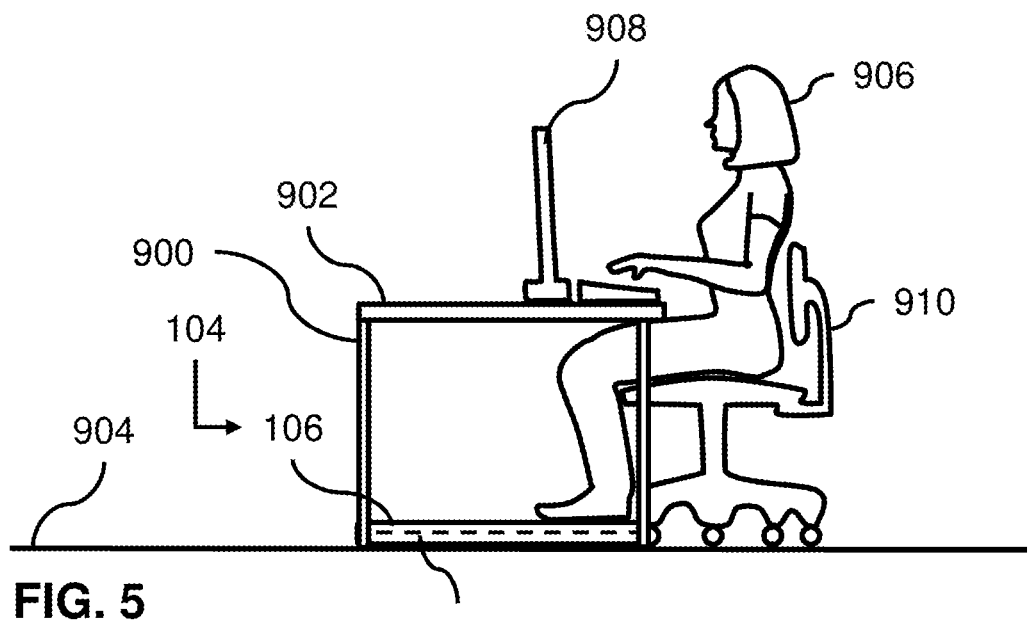

Referring to the embodiment as depicted in FIG. 5, the stationary frame assembly 106 is positioned underneath the desk 900 and in front of the user 906. For this embodiment, the ergonomic device 102 includes the anti-fatigue floor mat 202 (by way of example). The anti-fatigue floor mat 202 is fully received in the ergonomic device 102. The user 906 is sitting on a chair 910 (in front of the desk 900), and is using the computer 908 that is positioned on the desk 900. The bottom of the shoes of the user 906 make contact with the top surface of the stationary frame assembly 106. As depicted in FIG. 5, the anti-fatigue floor mat 202 is not deployed (that is, the anti-fatigue floor mat 202 is not required simply because the user 906 is sitting on the chair 910). The desk 900 is configured to be height adjustable (so that the computer 908 may be moved vertically as needed for the comfort of the user 906). When the user 906 needs to use the ergonomic device 102 (such as, the anti-fatigue floor mat 202), the user 906 may move the ergonomic device 102 from the interior of the ergonomic-device support assembly 104, and place the ergonomic-device support assembly 104 in front of the desk 900.

Figure 6:
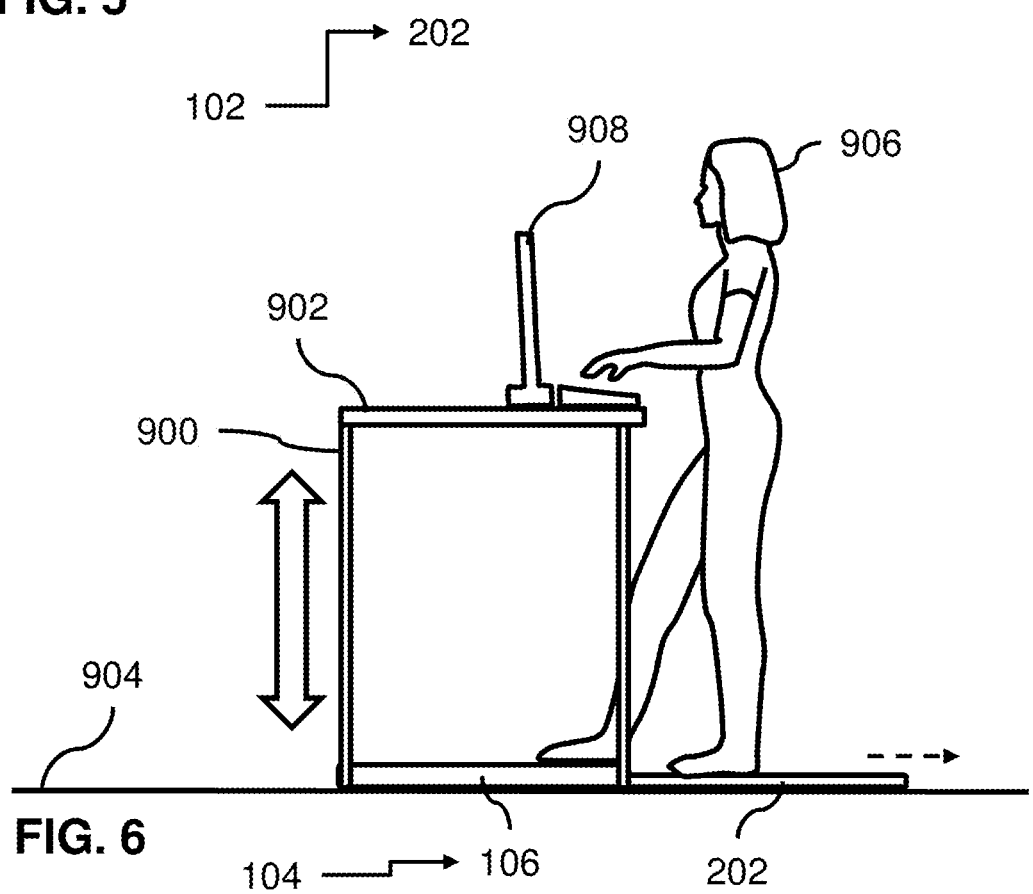

Referring to the embodiment as depicted in FIG. 6 (as compared to the embodiment as depicted in FIG. 5), the user 906 decides to stand, rather than sit, at the desk 900. The desk 900 is height adjusted in such a way that the height of the computer 908 is raised to a desired position (at a comfortable position for the user 906 relative to the embodiment as depicted in FIG. 5). The user 906 moves (pulls or deploys) the anti-fatigue floor mat 202 positioned inside the stationary frame assembly 106 to an extended (deployed) position, in which the anti-fatigue floor mat 202 rests on the working surface 904 at a position located in front of the desk 900 and away from beneath the desk 900. This is done in such a way that the user 906 may stand on the anti-fatigue floor mat 202 (while the user 906 uses the computer 908 positioned on the desk 900). The ergonomic-device support assembly 104 is configured to facilitate slide movement (movement) of the ergonomic device 102 from the interior of the ergonomic-device support assembly 104 to the exterior of the ergonomic-device support assembly 104 (as depicted in FIG. 6).

Figure 7:
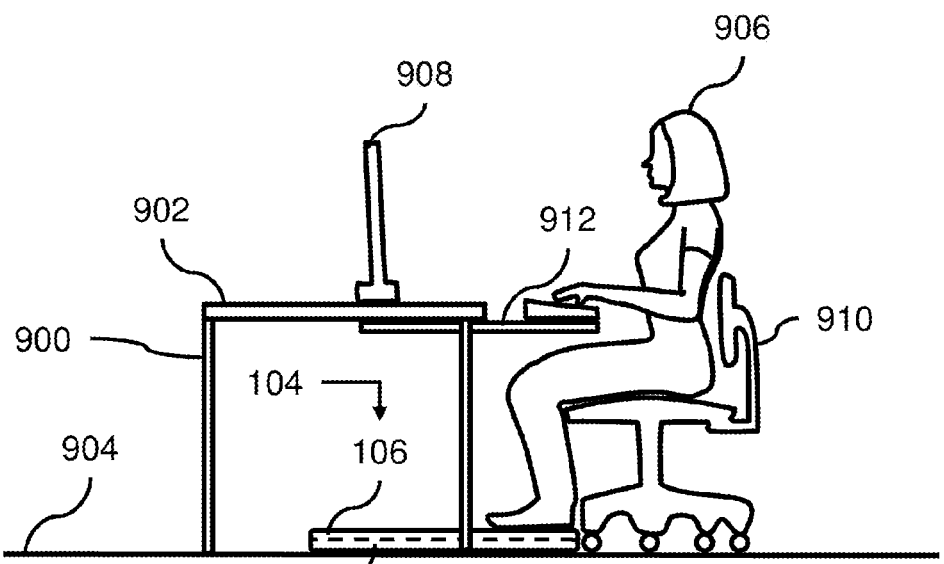

Referring to the embodiment as depicted in FIG. 7, the desk 900 is adapted to include a keyboard tray 912. The keyboard tray 912 is mounted to the underside of the desk 900. The stationary frame assembly 106 is moved and positioned so that the stationary frame assembly 106 extends from beneath the desk 900 to underneath (vertically underneath) the keyboard tray 912 (at a position located in front of the user 906, who is sitting on the chair 910 in front of the desk 900). As depicted, the ergonomic device 102 includes an anti-fatigue floor mat 202 (by way of example). When the user 906 decides to stand in front of the desk 900, the user 906 may raise the height-adjustable horizontal work surface 902 of the desk 900, move the roller device 914 and also move the anti-fatigue floor mat 202 from the interior of the ergonomic-device support assembly 104, and then stand on the anti-fatigue floor mat 202. In accordance with an option, the roller device 914 is configured to remain in a stationary position (does not move) if so desired. In accordance with another embodiment, the stationary frame assembly 106 does not provide a top surface unless the roller device 914 is included with the stationary frame assembly 106.

Figure 8:
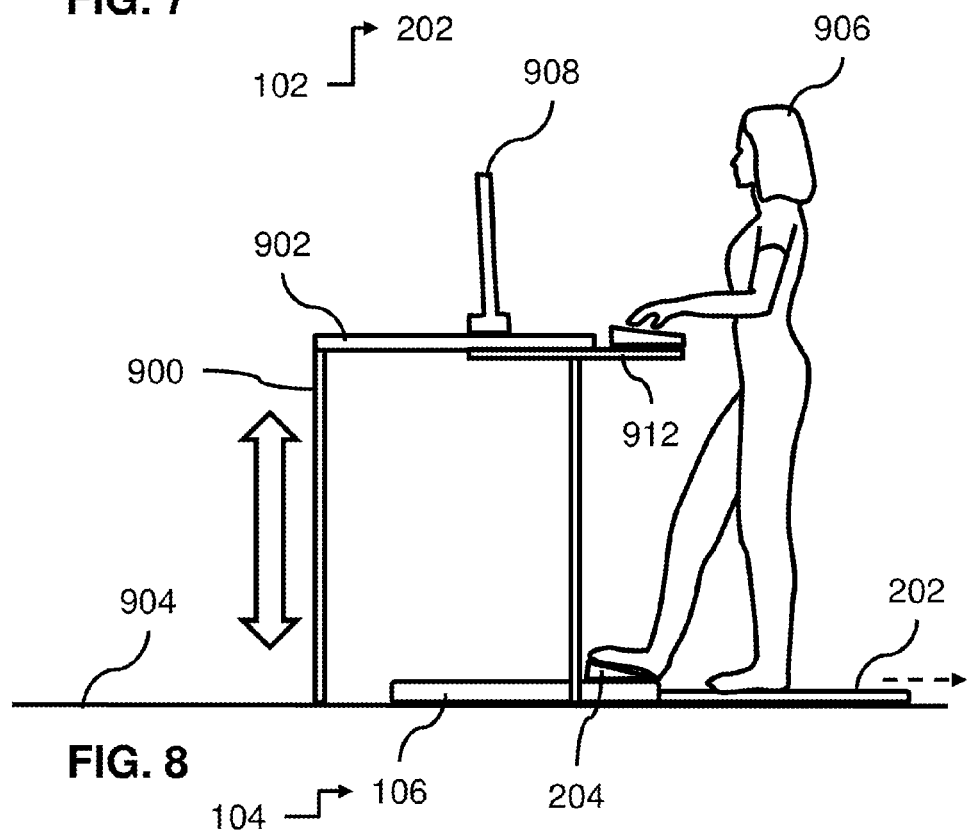

Referring to the embodiment as depicted in FIG. 8 (as compared to the embodiment as depicted in FIG. 7), the user 906 decides to stand at the desk 900 (as compared to the embodiment as depicted in FIG. 7). The height of the desk 900 is adjusted or vertically adjusted (since the desk 900 is configured to be height adjustable). The anti-fatigue floor mat 202 is moved, at least in apart, from the interior of the stationary frame assembly 106 to a position on the working surface 904 in which the user 906 may stand on the anti-fatigue floor mat 202. In accordance with an option, the foot-rest device 204 is positioned on the stationary frame assembly 106 in such a way that the user 906 may place a foot on the foot-rest device 204 (for improved comfort of standing at the desk 900, as depicted in the embodiment of FIG. 8). When the foot-rest device 204 is to be used, the foot-rest device 204 may be movable relative to the stationary frame assembly 106 to a storage position located away (spaced apart) from the user 906.

In accordance with the embodiments as depicted in FIGS. 5 to 10 and 13 (and in other FIGS.), there is depicted the case where the ergonomic device 102 includes an anti-fatigue floor mat 202. In the extended-deployment position (as depicted in FIG. 6), the anti-fatigue floor mat 202 has been moved away from beneath the desk 900 and in front of the desk 900 in such a way that the user 906 may stand on the anti-fatigue floor mat 202 (for instance, while a height-adjustable horizontal work surface 902 of the desk 900 is positioned at a user-standing position). In the retracted-storage position (as depicted in FIG. 5), the anti-fatigue floor mat 202 has been moved away from in front of the desk 900 to beneath the desk 900 and in such a way that the user 906 cannot (does not) stand on the anti-fatigue floor mat 202 (for instance, while the height-adjustable horizontal work surface 902 of the desk 900 is positioned at a user-sitting position as depicted in the embodiment of FIG. 5).

Figure 11:
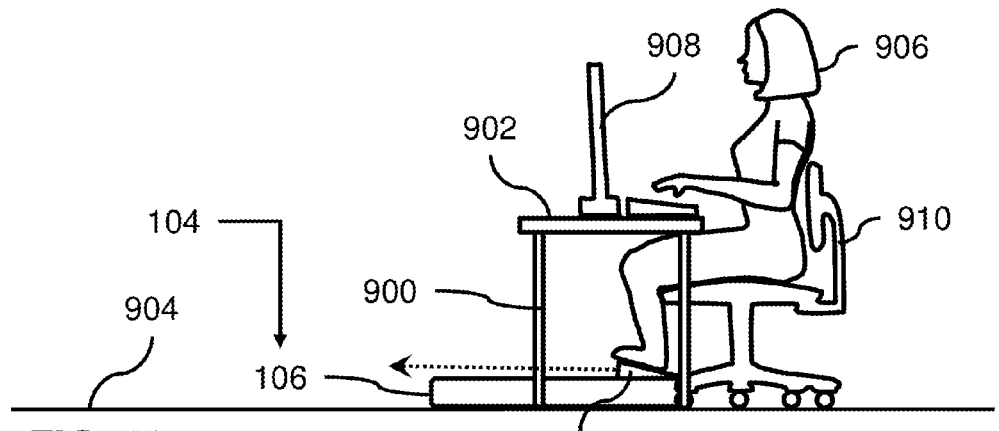
Figure 12:
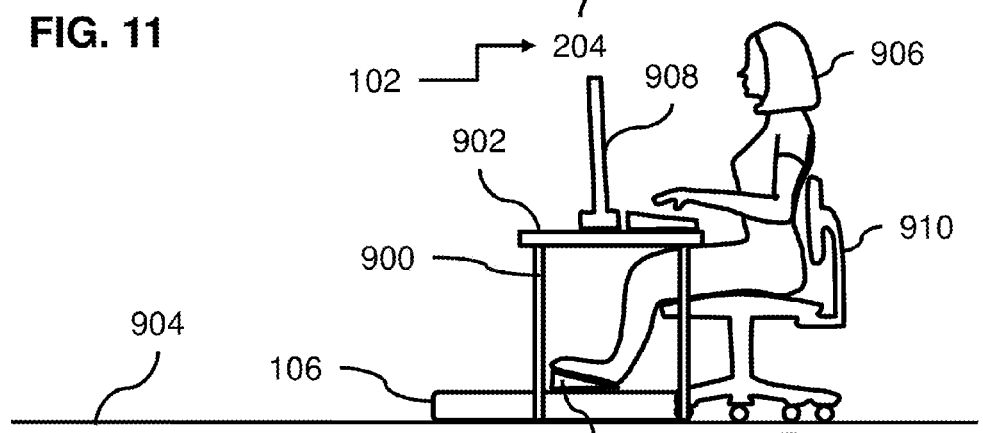
Figure 13:
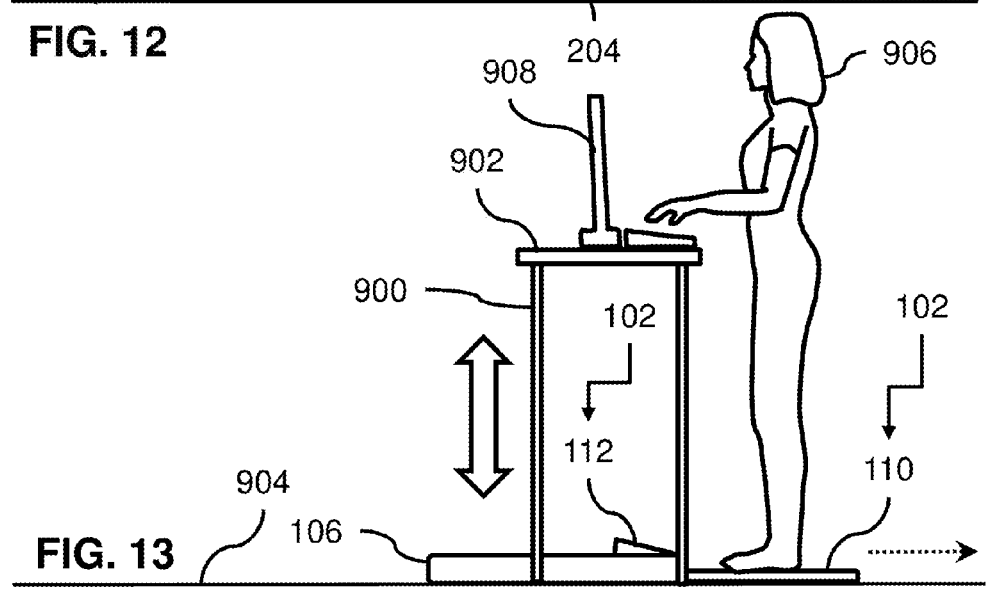

In accordance with the embodiments as depicted in FIGS. 8, 12 and 13, there is depicted the case where the ergonomic device 102 includes a foot-rest device 204. In the extended-deployment position (as depicted in FIGS. 8 and 11), the foot-rest device 204 has been moved beneath the desk 900 and proximate to the user 906 in such a way that the user 906 may place at least one foot on the foot-rest device 204. In the retracted-storage position (as depicted in FIG. 12), the foot-rest device 204 has been moved beneath the desk 900 and distal from the user 906 in such a way that the user 906 may or may not (or does not) use the foot-rest device 204 (if so desired, at the discretion of the user 906). Alternatively, the user 906 may continue to use the foot-rest device 204 for the case where the user 906 sits in front of the desk 900.

Figure 9:
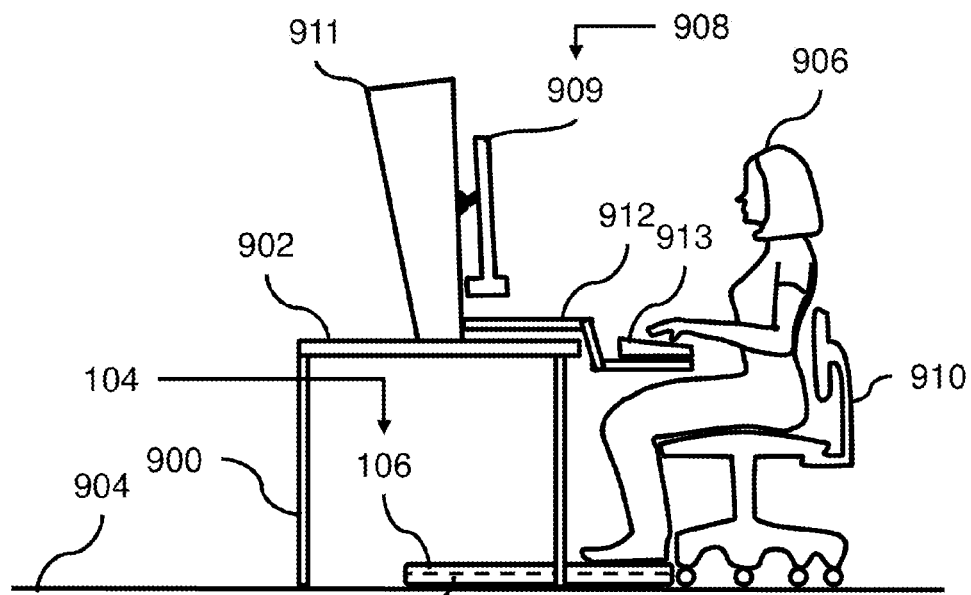

In accordance with the embodiment as depicted in FIG. 9, the desk 900 includes the height-adjustable assembly 911. Preferably, the height-adjustable assembly 911 is secured (affixed) to the top surface of the desk 900. The computer 908 is mounted to the height-adjustable assembly 911. The height-adjustable assembly 911 is configured to vertically position the display 909 of the computer 908 relative to the working surface 904 (to improve the comfort of the user 906 using the display 909 of the computer 908). The desk 900 also includes the keyboard tray 912 (also called an adjustable keyboard tray). The height-adjustable assembly 911 and the keyboard tray 912 are spatially adjusted and positioned so that the user 906 may comfortably use the display 909 of the computer 908 (and/or the keyboard 913 of the computer 908). The stationary frame assembly 106 is moved and positioned so that the stationary frame assembly 106 extends from beneath the desk 900 to underneath the keyboard tray 912 (at a position located in front of the user 906, who is sitting on the chair 910). For the case where the user 906 decides to stand while working at the desk 900, the user 906 may deploy (move) the anti-fatigue floor mat 202 from the interior of the stationary frame assembly 106. Generally, the stationary frame assembly 106 is configured to assist in the movement of the anti-fatigue floor mat 202 to a deployment position for use by the user 906.

Figure 10:
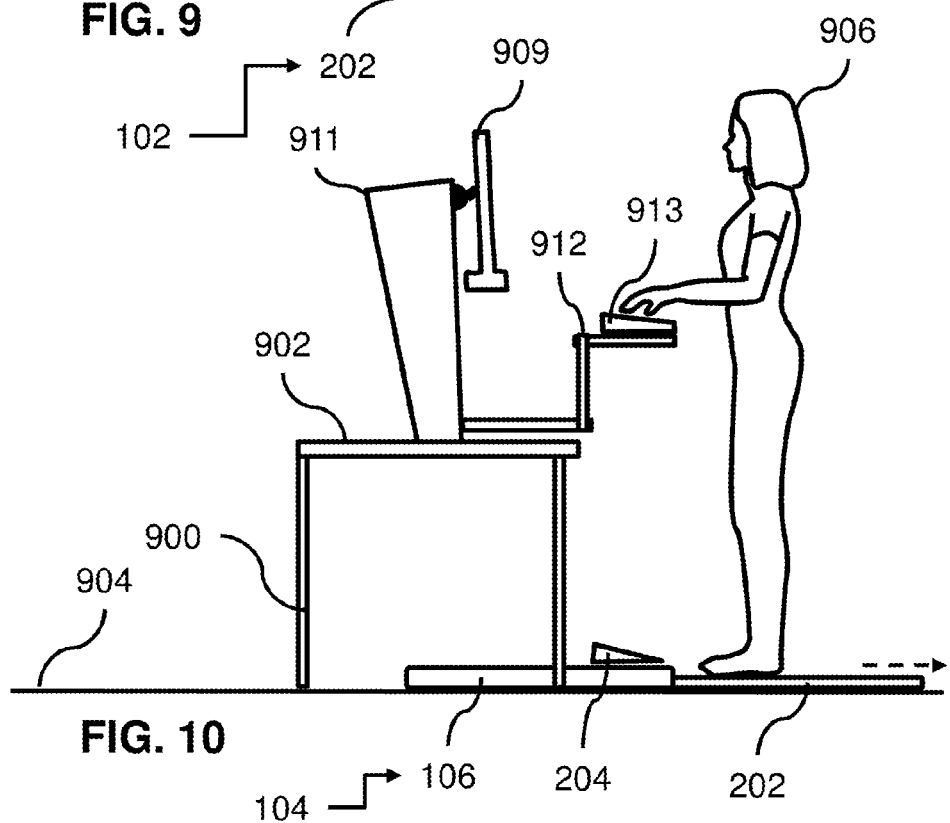

Referring to the embodiment as depicted in FIG. 10 (as compared to the embodiment as depicted in FIG. 9), the user 906 decides to stand at the desk 900. The height of the display 909 is adjusted by the height-adjustable assembly 911 (since the desk 900 is configured to be not height adjustable). For this case, the anti-fatigue floor mat 202 is moved, at least in apart, from the interior of the stationary frame assembly 106 to a position on the working surface 904 in which the user 906 may stand on the anti-fatigue floor mat 202. In accordance with an option, the foot-rest device 204 is positioned on the stationary frame assembly 106 in such a way that the user 906 may place a foot on the foot-rest device 204 (for improved comfort of standing at the desk 900).

Referring to the embodiments as depicted in FIGS. 11 and 12, the foot-rest device 204 is supported or is positioned on the stationary frame assembly 106. For FIGS. 10 and 11, the desk 900 does not have to be (is not) height adjustable. The foot-rest device 204 is configured to be movable between the extended position (as depicted in FIG. 11) and a retracted position (as depicted in FIG. 12). For FIGS. 11 and 12, the user 906 may use the foot-rest device 204 in the retracted position and the extended position if desired (for at least one foot of the user 906). Alternatively, the user 906 does not have to use the foot-rest device 204 if desired.

Referring to the embodiment as depicted in FIG. 13, the desk 900 is configured to be height adjustable, and the stationary frame assembly 106 is configured to support the first ergonomic device 110 (depicted as the anti-fatigue floor mat, for instance) and the second ergonomic device 112 (depicted as a foot rest, for instance).

Figure 14:
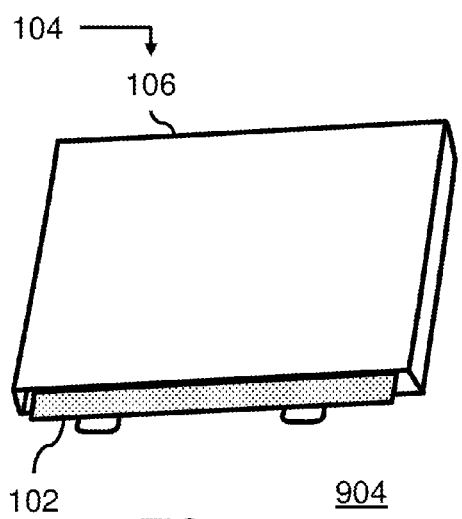
Figure 15:
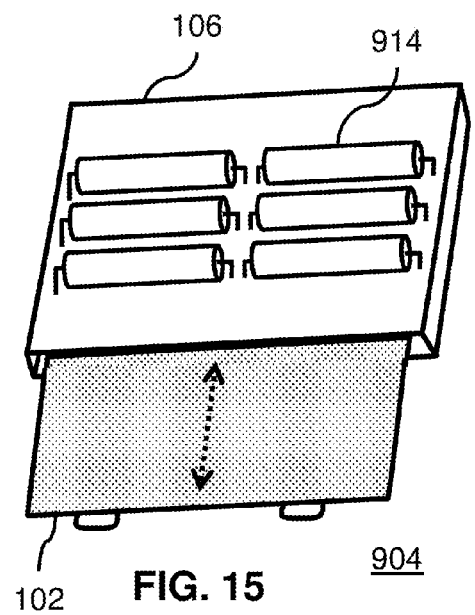

Referring to the embodiments as depicted in FIGS. 14 to 20, the apparatus is adapted such that the ergonomic-device support assembly 104 includes a stationary frame assembly 106 configured to be placed in a relatively stationary position on a working surface 904 (also called the floor or ground). In accordance with a preferred option, the friction of coefficient between the ergonomic-device support assembly 104 and the working surface 904 is relatively high (so that there is little or preferably no slippage between the ergonomic-device support assembly 104 and the working surface 904). It will be appreciated that a friction sheet (also called an anti-slippage sheet, known and not depicted) is positioned between the ergonomic-device support assembly 104 and the working surface 904 if so desired (to prevent relative slippage between the ergonomic-device support assembly 104 and the working surface 904). The stationary frame assembly 106 is configured to receive and support (either directly or indirectly) the ergonomic device 102 in such a way that the ergonomic device 102 is selectively movable relative to the stationary frame assembly 106 and also relative to the user 906 of the desk 900 (as depicted in FIGS. 5 and 6, for instance) between the extended-deployment position (as depicted in FIG. 15) and the retracted-storage position (as depicted in FIG. 14).

Referring to the embodiment as depicted in FIG. 14, the ergonomic device 102 is positioned (placed) in the storage position, in which the ergonomic device 102 is substantially received (at least in part) in the interior of the stationary frame assembly 106. In accordance with the embodiment as depicted in FIG. 14, the ergonomic device 102 includes an anti-fatigue floor mat. In accordance with the embodiment as depicted in FIG. 14, the entire upper section of the 104 covers (at least in part) a majority of the ergonomic device 102 that is received in the ergonomic-device support assembly 104 (apart from the frontal section of the ergonomic device 102 that extends from the interior of the stationary frame assembly 106).

Referring to the embodiment as depicted in FIG. 15 (as compared to the embodiment as depicted in FIG. 14), the ergonomic device 102 is positioned (placed) in the extended position, in which the ergonomic device 102 is substantially extended from the interior of the stationary frame assembly 106. In accordance with an option, the stationary frame assembly 106 includes a foot roller device 914 mounted to a top surface or top section of the stationary frame assembly 106. The roller device 914 is used by the user to help relive foot stress or foot cramps experienced by the user.

Figure 16:
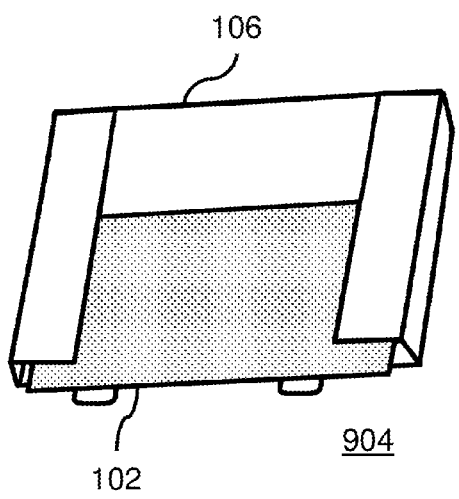
Figure 20:
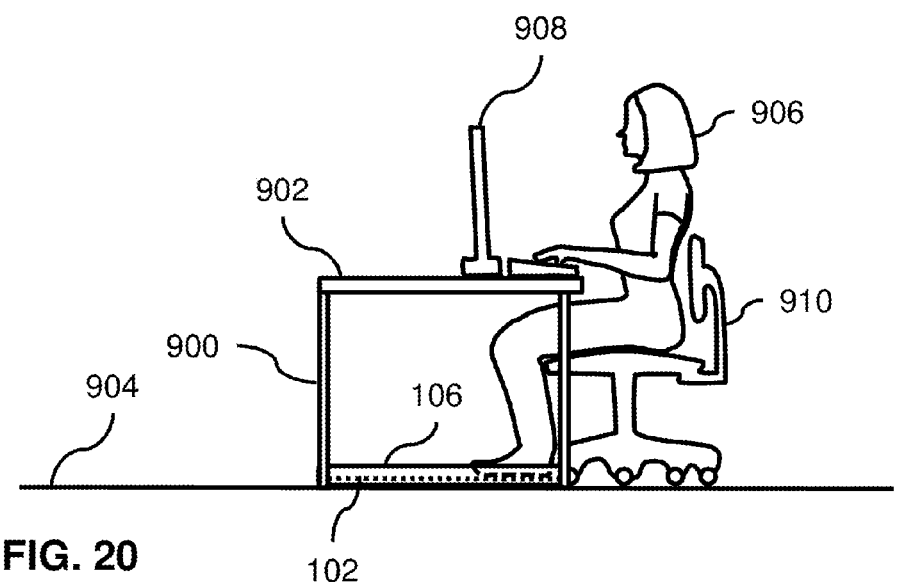

Referring to the embodiments as depicted in FIGS. 16 and 20, the ergonomic device 102 is positioned (placed) in the storage position, in which the ergonomic device 102 is substantially received in the interior of the stationary frame assembly 106. As depicted, the ergonomic device 102 includes an anti-fatigue floor mat. In accordance with the embodiment as depicted, the upper section of the ergonomic device 102 defines an open zone (notch) in which a portion of the ergonomic device 102 that is received in the stationary frame assembly 106 is revealed or exposed to the user. In this manner, the user may place at least one foot on the top surface of the ergonomic device 102 once the user sits on a chair (as depicted in FIG. 20). The top section of the stationary frame assembly 106 may include horizontal panels that fit with each other (abut with each other), and cover (at least in part) the ergonomic device 102. It will be appreciated that the notch is configured (sized) in such a way that the notch permit the feet of the user to the contact the anti-fatigue floor mat that is supported by the stationary frame assembly 106. It will be appreciated that in accordance with an embodiment, the stationary frame assembly 106 may be fully open (so that the feet of the user always rest on the anti-fatigue floor mat that is supported by the stationary frame assembly 106 when the user is sitting at the desk.

Figure 17:
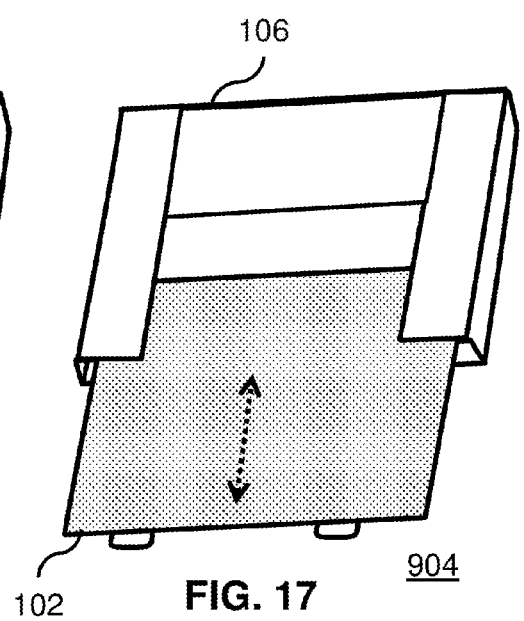

Referring to the embodiment as depicted in FIG. 17 (as compared to the embodiment as depicted in FIG. 16), the ergonomic device 102 is positioned (placed) in the extended position, in which the ergonomic device 102 is substantially extended from the stationary frame assembly 106 (for use by the user who desires to stand in front of the desk).

Figures 18, 19:
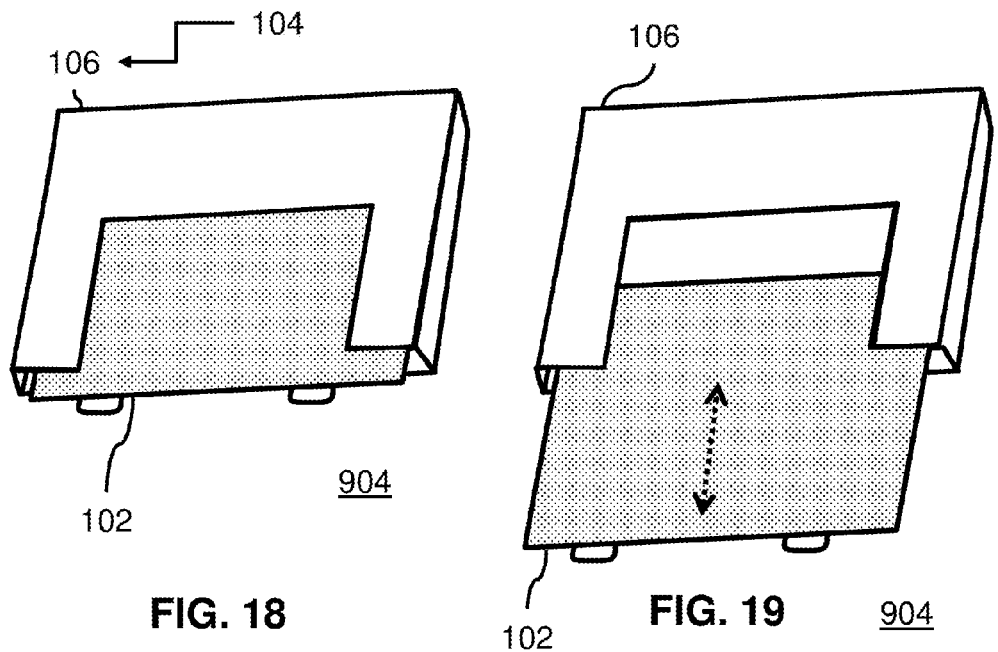

Referring to the embodiment as depicted in FIG. 18, the ergonomic device 102 is positioned (placed) in the storage position, in which the ergonomic device 102 is substantially received in the interior of the stationary frame assembly 106. As depicted, the ergonomic device 102 includes an anti-fatigue floor mat. In accordance with the embodiment as depicted, the upper section of the ergonomic device 102 defines an open zone (notch) in which a portion of the ergonomic device 102 that is received in the stationary frame assembly 106 is revealed (to a user). In this manner, the user may place at least one foot on the top surface of the ergonomic device 102 once the user sits on a chair (as depicted in FIG. 20). The top section of the stationary frame assembly 106 may include a single horizontal panel forming the open zone (notch).

Referring to the embodiment as depicted in FIG. 19 (as compared to the embodiment as depicted in FIG. 18), the ergonomic device 102 is positioned (placed) in the extended position, in which the ergonomic device 102 is substantially extended from the stationary frame assembly 106. The user may use the ergonomic device 102 when the user desires to stand in front of the desk.

Figure 21:
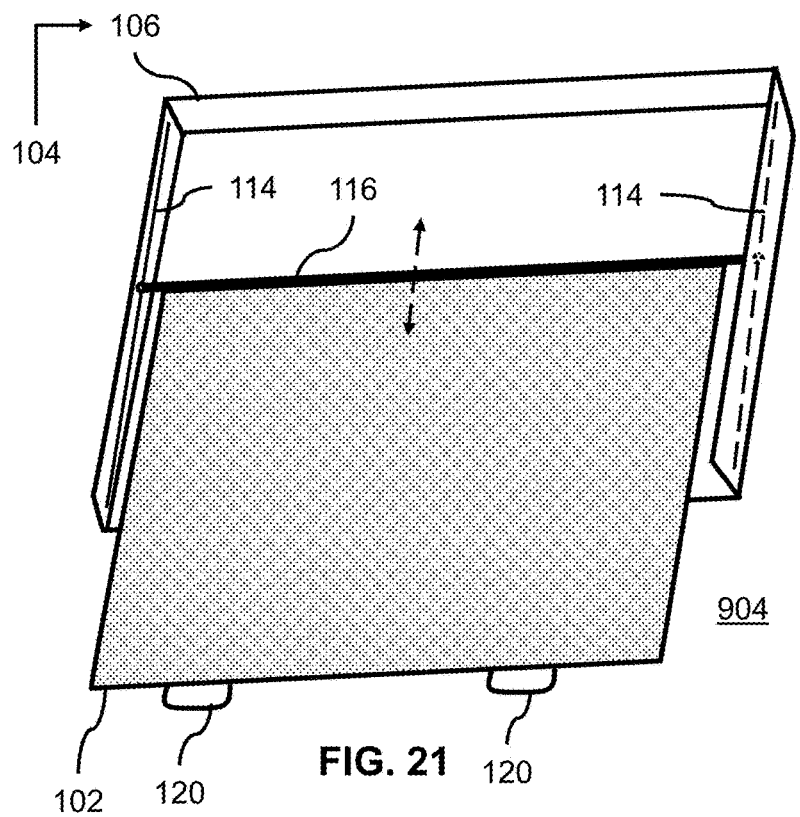

Referring to the embodiments as depicted in FIGS. 21 and 23, the top section of the stationary frame assembly 106 has been removed in order to reveal the interior of the stationary frame assembly 106 (for the sake of convenient description). The stationary frame assembly 106 includes opposed track sections 114 fixedly mounted to opposite vertically extending lateral sidewalls of the stationary frame assembly 106. The ergonomic device 102 is depicted as an anti-fatigue working surface mat. The opposed track sections 114 are configured to facilitate linear slide movement of the ergonomic device 102 (between a deployed position and a retracted position). Specifically, the opposed track sections 114 (in use) slidably interface with the opposite lateral sides of the ergonomic device 102 (the anti-fatigue working surface mat) in such a way as to facilitate or accommodate glide movement of the ergonomic device 102. Preferably, a slide bar 116 is positioned in the interior of the stationary frame assembly 106. This is done in such a way that the opposite distal end sections of the slide bar 116 are slidably engaged with the opposed track sections 114. The ergonomic device 102 is fixedly attached to a length of the slide bar 116.

Figure 22:
Figure 23:
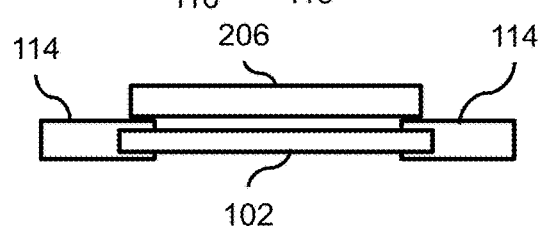

Referring to the embodiment as depicted in FIG. 22, the opposed track sections 114 are relatively close to the working surface 904 (proximate to the user). As the slide bar 116 slides distal (away) from the user, the opposed track section 114 gradually increases its distance (height) from the working surface (as depicted in FIG. 22) to help eliminate friction from the working surface as the anti-fatigue mat will not be touching the working surface 904 (floor) on the distal end of the stationary frame assembly 106. The slope of opposed track sections 114 increases from one end to the opposite end of the stationary frame assembly 106. It will be appreciated that the sliding device 118 is configured to avoid the user from inadvertent slippage when the anti-fatigue mat is placed in the extended position (to avoid having the user accidentally slip and fall).

Referring to the embodiments as depicted in FIGS. 21 and 23, it will be appreciated that the removal of the top section of the stationary frame assembly 106 is permanent. For the case where the user is sitting at the desk, the knees of the user may be positioned not higher than the hips of the user (and this arrangement improves ergonomic comfort of the user) as a result of removing the top section of the stationary frame assembly 106 (so that the user's feet may contact the anti-fatigue floor mat that is supported by the stationary frame assembly 106.

Referring to the embodiment as depicted in FIG. 22, preferably the ergonomic device 102 includes a sliding device 118 (slider) installed to a floor-facing surface of the ergonomic device 102. The sliding device 118 is configured to reduce sliding friction of the ergonomic device 102. Preferably, the ergonomic device 102 also includes a handle 120 configured to facilitate user manipulation (movement) of the ergonomic device 102. It will be appreciated that a motor 206 (known and depicted) may be used to automate or assist in the movement of the ergonomic device 102 (if so desired).

Referring to the embodiment as depicted in FIG. 23, the opposed track sections 114 define opposed grooves that face each other, and the opposed grooves are configured to be slide engageable with the peripheral lateral side edges of the ergonomic device 102.

Figure 24:
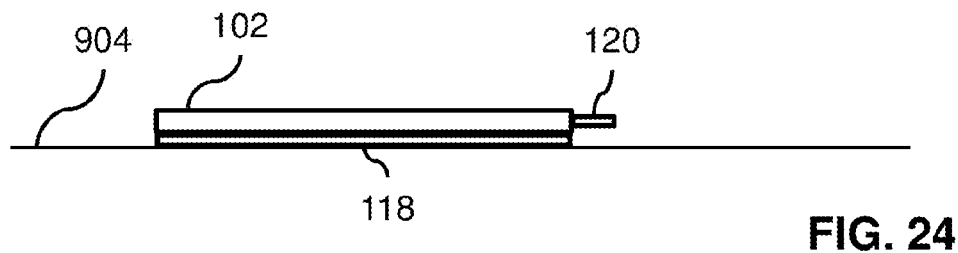
Figure 25:
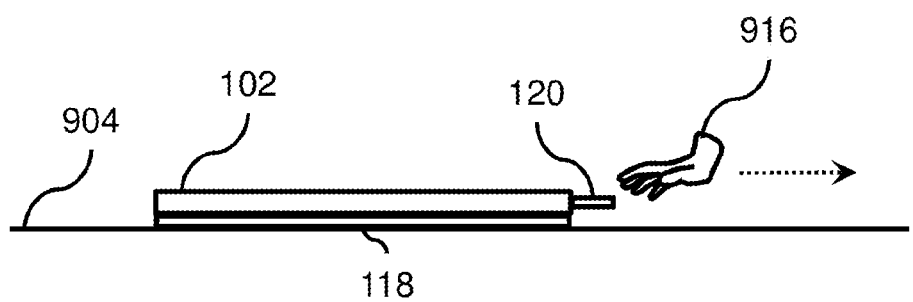
Figure 26:
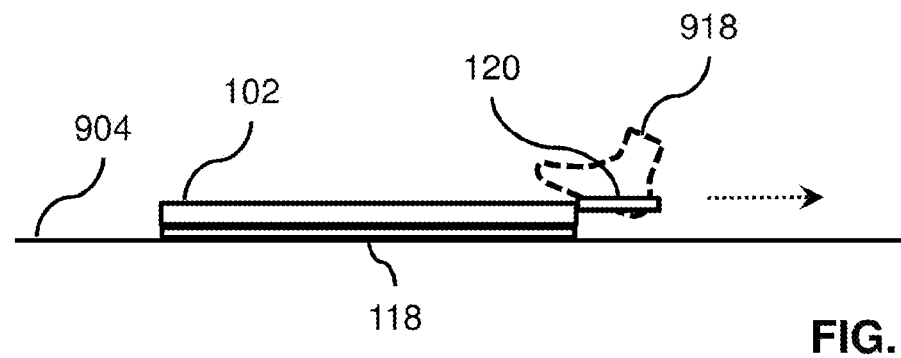
Figure 27:
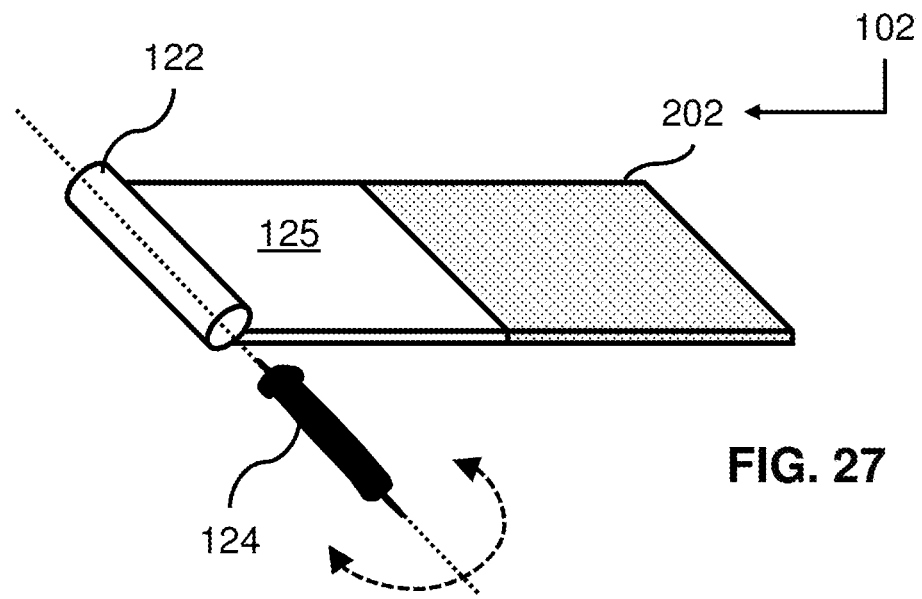

Referring to the embodiments as depicted in FIGS. 24 to 26, the handle 120 is fixedly positioned on a peripheral zone of the ergonomic device 102, which is depicted as an anti-fatigue floor mat (that is, positioned at one side of the ergonomic device 102). As depicted in FIG. 25, the handle 120 is configured to be grasped and manipulated by the hand 916 of the user (so that the ergonomic device 102 is movable by the hand 916 of the user). As depicted in FIG. 26, the handle 120 is configured to be manipulated by the foot 918 of the user (so that the ergonomic device 102 is movable by the foot 918 of the user).

Figure 28:
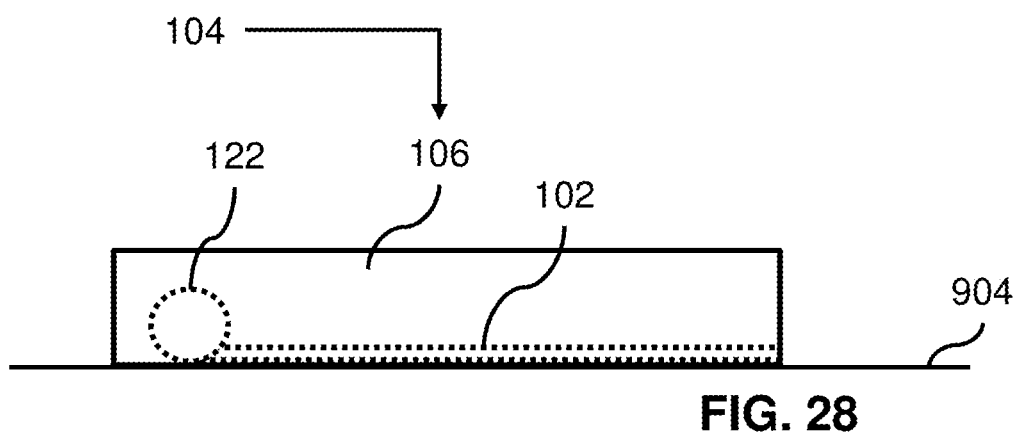
Figure 29:
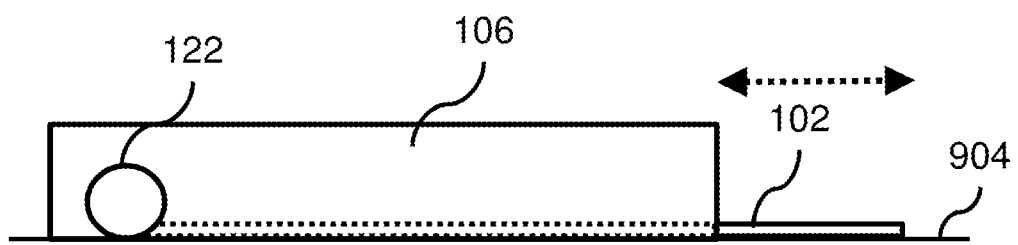

Referring to the embodiments as depicted in FIGS. 27 to 29, the ergonomic device 102 includes an anti-fatigue floor mat 202. The stationary frame assembly 106 includes a roller mechanism 122 having a torsion spring device 124. The roller mechanism 122 is fixedly mounted in the interior of the stationary frame assembly 106. The roller mechanism 122 is attached to a leading sheet 125 that is configured to be attached to an edge section of the ergonomic device 102. The roller mechanism 122 is configured to retract the ergonomic device 102 in a manner that is similar to the spring-rolling systems used in window covering blinds. The leading sheet 125 is configured to be taken up by the roller mechanism 122. The roller mechanism 122 is configured to selectively move and assist the movement of the ergonomic device 102 relative to the ergonomic-device support assembly 104 between the storage position and the deployed position.

Referring to the embodiments as depicted in FIGS. 30 to 35, the ergonomic device 102 is configured to accommodate the first ergonomic device 110 (such as, an anti-fatigue floor mat) and the second ergonomic device 112 (such as, a foot-rest device). The movable frame assembly 108 includes parallel-aligned and spaced-apart rails 126 fixedly mounted to a top surface of the stationary frame assembly 106. The movable frame assembly 108 extends a length between the front section and the rear section of the stationary frame assembly 106. The movable frame assembly 108 is configured to facilitate linear slide movement of the second ergonomic device 112 between the front section and the rear section of the stationary frame assembly 106. It will be appreciated that FIGS. 30, 32 and 34 depict the case where the storage position for the first ergonomic device 110. It will be appreciated that FIGS. 31, 33 and 35 depict the case where the deployment position for the first ergonomic device 110. For the case where the user is sitting in a chair in front of the desk, the second ergonomic device 112 is adjustably positioned (relative to the ergonomic-device support assembly 104) to suit the ergonomic needs of the user.

Referring to the embodiments as depicted in FIGS. 36 to 39, the ergonomic device 102 is configured to accommodate the second ergonomic device 112 (and the first ergonomic device 110 is not included or deployed with the ergonomic-device support assembly 104). The movable frame assembly 108 includes parallel-aligned and spaced-apart rails 126 fixedly mounted to a top surface of the stationary frame assembly 106. The movable frame assembly 108 is configured to facilitate linear slide movement of the second ergonomic device 112 between the front section and the rear section of the stationary frame assembly 106.

Figures 36, 37:
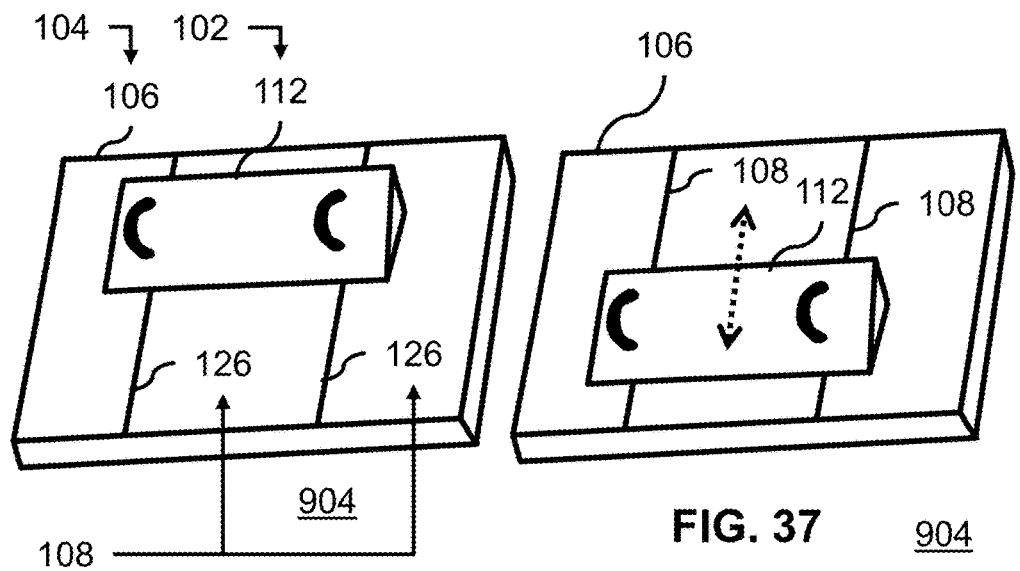

Referring to the embodiments as depicted in FIGS. 36 to 37, the ergonomic-device support assembly 104 includes a solid top panel extending across opposite lateral sections of the ergonomic-device support assembly 104 (so that the user may not place his or her feet onto the top surface of the ergonomic device 102).

Figures 38, 39:
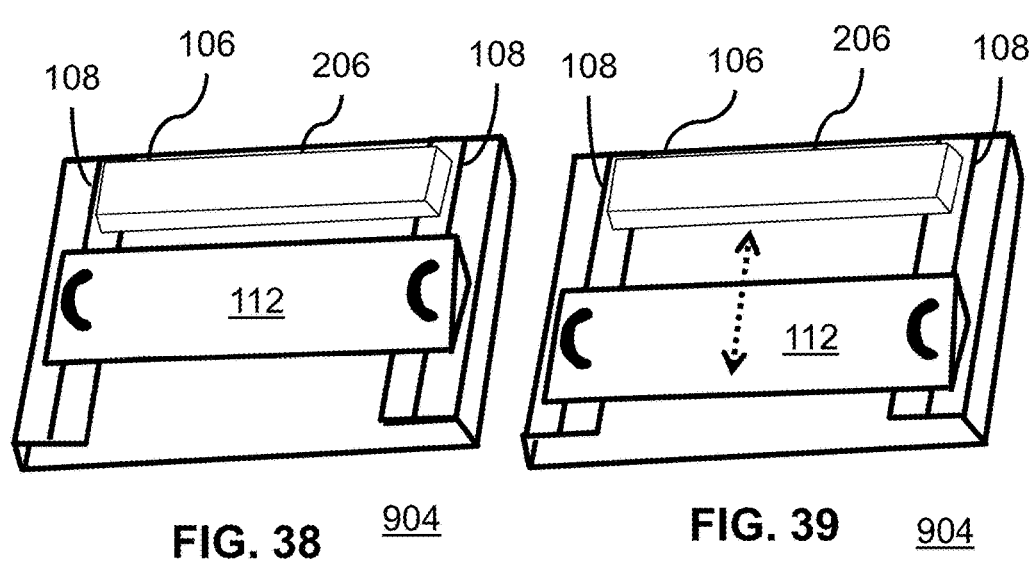

Referring to the embodiments as depicted in FIGS. 38 to 39, the ergonomic-device support assembly 104 includes a notched solid top panel extending across opposite lateral sections of the ergonomic-device support assembly 104 (so that the user may place their feet onto the top surface of the ergonomic device 102). Referring to the embodiments as depicted in FIGS. 30 to 39, the apparatus is adapted such that the ergonomic-device support assembly 104 includes a synergistic combination of a stationary frame assembly 106 and a movable frame assembly 108. The stationary frame assembly 106 is configured to be placed in a relatively stationary position (as depicted in FIG. 30) on a working surface 904 (also called the floor or ground). The movable frame assembly 108 is movably coupled to, and supported by, the stationary frame assembly 106 in such a way that the movable frame assembly 108 is movable relative to the stationary frame assembly 106. The movable frame assembly 108 is configured to receive and support (either directly or indirectly) the ergonomic device 102 in such a way that the ergonomic device 102 is selectively movable relative to the stationary frame assembly 106 and also relative to the user 906 of the desk 900 between the extended-deployment position (as depicted in FIG. 31) and the retracted-storage position (as depicted in FIG. 30).

Referring to the embodiments as depicted in FIGS. 30 to 39, the apparatus is adapted such that the movable frame assembly 108 is also configured to selectively move the ergonomic device 102 along the working surface 904 actively by a motor 206 (known and depicted) attached to the stationary frame assembly 106.

Referring to the embodiments as depicted in FIGS. 30 to 39, the apparatus is adapted such that the movable frame assembly 108 is also configured to selectively move the ergonomic device 102 along the working surface 904 passively by having the user 906 move (push) the movable frame assembly 108 with any one of the foot or the hand of the user 906 (similar to the embodiments as depicted in FIGS. 25 to 26).

Referring to the embodiments as depicted in FIGS. 30 to 35 (and in FIG. 13), the apparatus is adapted such that the ergonomic device 102 includes (and is not limited to) a first ergonomic device 110, and a second ergonomic device 112 positioned relative to the first ergonomic device 110.

Referring to the preferred embodiments as depicted in FIGS. 30 to 35 (and in FIG. 13), the apparatus is adapted such that the ergonomic device 102 includes a first ergonomic device 110 and a second ergonomic device 112 positioned relative to the first ergonomic device 110. The stationary frame assembly 106 is configured to receive and support (either directly or indirectly) the first ergonomic device 110 in such a way that the first ergonomic device 110 is selectively movable relative to the stationary frame assembly 106 (and also relative to the user 906 of the desk 900) between the extended-deployment position (as depicted in FIG. 31) and the retracted-storage position (as depicted in FIG. 30). The movable frame assembly 108 is movably coupled to, and supported by, the stationary frame assembly 106 in such a way that the movable frame assembly 108 is movable relative to the stationary frame assembly 106. The movable frame assembly 108 is configured to receive and support (either directly or indirectly) the second ergonomic device 112 in such a way that the second ergonomic device 112 is selectively movable relative to the stationary frame assembly 106 and also relative to the user 906 of the desk 900 (such as, between the extended-deployment position, as depicted in FIG. 31, and the retracted-storage position, as depicted in FIG. 30).

Referring to the embodiments as depicted in FIGS. 30 to 35, several options are provided. For instance, the ergonomic device 102 includes any one of an anti-fatigue floor mat 202 and a foot-rest device 204 (and any equivalent thereof). The foot-rest device 204 is positioned relative to the anti-fatigue floor mat 202. For instance, the desk 900 includes a height-adjustable horizontal work surface 902 that is movable between a user-sitting position (as depicted in FIG. 5) and a user-standing position (as depicted in FIG. 6).

It will be appreciated that the description identifies and describes options and variations of the apparatus, regardless of whether the description identifies the options and/or variations of the apparatus by way of explicit terms and/or non-explicit terms. Other options for the apparatus as identified in this paragraph may include any combination and/or permutation of the technical features (assemblies, components, items, devices, etc.) as identified in the detailed description, as may be required and/or desired to suit a particular technical purpose and/or technical function. It will be appreciated, that where possible, any one or more of the technical features and/or any one or more sections of the technical features of the apparatus may be combined with any other one or more of the technical features and/or any other one or more sections of the technical features of the apparatus in any combination and/or permutation. Any one or more of the technical features and/or any one or more sections of the technical features of the apparatus may stand on its own merit without having to be combined with another other technical feature. It will be appreciated that persons skilled in the art would know that technical features of each embodiment may be deployed (where possible) in other embodiments even if not expressly stated as such above. It will be appreciated that persons skilled in the art would know that other options would be possible for the configuration of the components of the apparatus (if so desired) to adjust to manufacturing requirements and still remain within the scope of the invention as described in at least one or more of the claims. This written description uses examples to disclose the invention, including the best mode, and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims. It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. An apparatus for placement relative to a desk and a user, the apparatus comprising:
   an ergonomic-device support assembly including a stationary frame assembly being configured to be received and selectively positioned underneath the desk relative to the user; and
   the ergonomic-device support assembly being configured to receive and support an ergonomic device in such a way that the ergonomic device is selectively movable relative to the user of the desk between an extended-deployment position and a retracted-storage position; and
   wherein:
      the ergonomic-device support assembly is configured to receive and support the ergonomic device, in which the ergonomic device includes:
         a first ergonomic device; and
         a second ergonomic device being positioned relative to the first ergonomic device; and
      the stationary frame assembly is configured to be placed in a relatively stationary position on a working surface; and
      the stationary frame assembly is configured to receive and support the first ergonomic device in such a way that the first ergonomic device is selectively movable relative to the stationary frame assembly and also relative to the user of the desk between the extended-deployment position and the retracted-storage position; and
      the ergonomic-device support assembly further includes:
         a movable frame assembly being movably coupled to, and supported by, the stationary frame assembly in such a way that the movable frame assembly is movable relative to the stationary frame assembly; and
         the movable frame assembly being configured to receive and support the second ergonomic device in such a way that the second ergonomic device is selectively movable relative to the stationary frame assembly and also relative to the user of the desk between the extended-deployment position and the retracted-storage position.

2. An apparatus for placement relative to a desk and a user, the apparatus comprising:
   an ergonomic device; and
   an ergonomic-device support assembly including a stationary frame assembly being configured to be received and selectively positioned underneath the desk relative to the user; and
   the ergonomic-device support assembly being configured to receive and support the ergonomic device in such a way that the ergonomic device is selectively movable relative to the user of the desk between an extended-deployment position and a retracted-storage position; and
   wherein:
      the ergonomic device includes:
         a first ergonomic device; and a second ergonomic device being positioned relative to the first ergonomic device; and the stationary frame assembly is configured to be placed in a relatively stationary position on a working surface; and the stationary frame assembly is configured to receive and support the first ergonomic device in such a way that the first ergonomic device is selectively movable relative to the stationary frame assembly and also relative to the user of the desk between the extended-deployment position and the retracted-storage position; and the ergonomic-device support assembly further includes:

a movable frame assembly being movably coupled to, and supported by, the stationary frame assembly in such a way that the movable frame assembly is movable relative to the stationary frame assembly; and the movable frame assembly being configured to receive and support the second ergonomic device in such a way that the second ergonomic device is selectively movable relative to the stationary frame assembly and also relative to the user of the desk between the extended-deployment position and the retracted-storage position.

3. The apparatus of claim 2, wherein:
the stationary frame assembly is configured to receive and support the ergonomic device in such a way that the ergonomic device is selectively movable relative to the stationary frame assembly and also relative to the user of the desk between the extended-deployment position and the retracted-storage position.

4. The apparatus of claim 2, wherein:
the movable frame assembly is also configured to selectively move the ergonomic device along the working surface actively by a motor attached to the stationary frame assembly.

5. The apparatus of claim 2, wherein:
the movable frame assembly is also configured to selectively move the ergonomic device along the working surface passively by having the user move the movable frame assembly.

6. The apparatus of claim 2, wherein:
the ergonomic device includes an anti-fatigue floor mat.

7. The apparatus of claim 2, wherein:
the ergonomic device includes a foot-rest device.

8. The apparatus of claim 2, wherein:
the ergonomic device includes:
an anti-fatigue floor mat; and
a foot-rest device positioned relative to the anti-fatigue floor mat; and
the stationary frame assembly is configured to receive and support the anti-fatigue floor mat in such a way that the anti-fatigue floor mat is selectively movable relative to the stationary frame assembly between the extended-deployment position and the retracted-storage position; and
the movable frame assembly is configured to receive and support the foot-rest device in such a way that the foot-rest device is selectively movable relative to the stationary frame assembly between the extended-deployment position and the retracted-storage position.

9. The apparatus of claim 2, wherein:
the ergonomic device includes an anti-fatigue floor mat; and in the extended-deployment position, the anti-fatigue floor mat has been moved away from beneath the desk and in front of the desk; and in the retracted-storage position, the anti-fatigue floor mat has been moved away from in front of the desk to beneath the desk; and the stationary frame assembly is configured to receive and support the anti-fatigue floor mat in such a way that the anti-fatigue floor mat is selectively movable relative to the stationary frame assembly between the extended-deployment position and the retracted-storage position.

10. The apparatus of claim 2, wherein:
the ergonomic device includes a foot-rest device; and
in the extended-deployment position, the foot-rest device has been moved beneath the desk and proximate to the user; and
in the retracted-storage position, the foot-rest device has been moved beneath the desk and distal from the user.

11. The apparatus of claim 2, wherein:
the ergonomic device further includes a handle configured to facilitate user manipulation and movement of the ergonomic device.

12. An apparatus for a desk and for a user, the apparatus comprising:
an ergonomic device; and
an ergonomic-device support assembly including a stationary frame assembly being configured to be received and selectively positioned underneath the desk relative to the user; and
the ergonomic-device support assembly being configured to receive and support the ergonomic device in such a way that the ergonomic device is selectively movable relative to the user of the desk between an extended-deployment position and a retracted-storage position; and
wherein:
the stationary frame assembly includes opposed track sections fixedly mounted to opposite vertically extending lateral sidewalls of the stationary frame assembly; and
the opposed track sections are configured to facilitate linear slide movement of the ergonomic device; and
the opposed track sections, in use, slidably interface with opposite lateral sides of the ergonomic device.

13. The apparatus of claim 12, wherein:
a slide bar is positioned in the interior of the stationary frame assembly in such a way that opposite distal end sections of the slide bar are slidably engaged with the opposed track sections; and
the ergonomic device is fixedly attached to a length of the slide bar.

14. The apparatus of claim 12, wherein:
the opposed track sections define opposed grooves that face each other, and the opposed grooves are configured to be slide engageable with peripheral lateral side edges of the ergonomic device.

15. An apparatus for a desk and for a user, the apparatus comprising:
an ergonomic device; and
an ergonomic-device support assembly including a stationary frame assembly being configured to be received and selectively positioned underneath the desk relative to the user; and
the ergonomic-device support assembly being configured to receive and support the ergonomic device in such a way that the ergonomic device is selectively movable relative to the user of the desk between an extended-deployment position and a retracted-storage position; and
wherein:
the stationary frame assembly includes a roller mechanism having a torsion spring device; and
the roller mechanism is fixedly mounted in the interior of the stationary frame assembly; and
the roller mechanism is configured to selectively move and assist movement of the ergonomic device relative to the ergonomic-device support assembly; and
the roller mechanism is configured to be attached to the ergonomic device; and
the roller mechanism is configured to retract the ergonomic device; and
the roller mechanism is configured to selectively move and assist the movement of the ergonomic device relative to the ergonomic-device support assembly.

16. The apparatus of claim 2, wherein:
the movable frame assembly includes parallel-aligned and spaced-apart rails fixedly mounted to a top surface of the stationary frame assembly; and
the movable frame assembly extends a length between a front section and a rear section of the stationary frame assembly.

17. The apparatus of claim 2, wherein:
the movable frame assembly is configured to facilitate linear slide movement of the second ergonomic device between a front section and a rear section of the stationary frame assembly.

18. The apparatus of claim 1, wherein:
the movable frame assembly is also configured to selectively move the ergonomic device along the working surface actively by a motor attached to the stationary frame assembly.

19. The apparatus of claim 1, wherein:
the movable frame assembly is also configured to selectively move the ergonomic device along the working surface passively by having the user move the movable frame assembly.

20. The apparatus of claim 1, wherein:
the ergonomic device includes:
an anti-fatigue floor mat; and
a foot-rest device positioned relative to the anti-fatigue floor mat; and
the stationary frame assembly is configured to receive and support the anti-fatigue floor mat in such a way that the anti-fatigue floor mat is selectively movable relative to the stationary frame assembly between the extended-deployment position and the retracted-storage position; and
the movable frame assembly is configured to receive and support the foot-rest device in such a way that the foot-rest device is selectively movable relative to the stationary frame assembly between the extended-deployment position and the retracted-storage position.

* * * * *